United States Patent [19]

Crosgrove et al.

[11] 4,332,639
[45] Jun. 1, 1982

[54] FAILED ELEMENT DETECTION AND LOCATION SYSTEM AND METHOD FOR USE IN A NUCLEAR REACTOR

[75] Inventors: Robert O. Crosgrove, Chatsworth; Edward Moody, Simi; Harold L. Sletten, Northridge, all of Calif.

[73] Assignee: Electric Power Research Institute, Inc., Palo Alto, Calif.

[21] Appl. No.: 13,409

[22] Filed: Feb. 21, 1979

[51] Int. Cl.³ ............................................. G21C 17/00
[52] U.S. Cl. ..................................................... 376/253
[58] Field of Search .................................. 176/19 LD

[56] References Cited

U.S. PATENT DOCUMENTS

| | | |
|---|---|---|
| 3,395,074 | 7/1968 | Pouet et al. ................... 176/19 LD |
| 3,453,867 | 7/1968 | Webb et al. ................... 176/19 LD |
| 3,612,860 | 10/1971 | Hackney ........................ 176/19 LD |
| 3,768,257 | 1/1974 | Weiss et al. .................... 176/19 LD |
| 3,775,245 | 11/1973 | Delisle et al. ................... 176/19 LD |
| 3,806,409 | 4/1974 | Debergh et al. ............... 176/19 LD |
| 3,943,365 | 3/1976 | Aristurkhov et al. .......... 176/19 LD |
| 3,947,318 | 3/1976 | Zhuchovet al. ................ 176/19 LD |
| 3,964,964 | 6/1976 | Fryer et al. ..................... 176/19 LD |
| 4,082,607 | 4/1978 | Divona ........................... 176/19 LD |

FOREIGN PATENT DOCUMENTS

| | | |
|---|---|---|
| 889203 | 2/1962 | United Kingdom .......... 176/19 LD |
| 915215 | 1/1963 | United Kingdom .......... 176/19 LD |
| 943496 | 12/1963 | United Kingdom .......... 176/19 LD |

Primary Examiner—Sal Cangialosi
Attorney, Agent, or Firm—Flehr, Hohbach, Test

[57] ABSTRACT

A failed element detection and location system for use in a nuclear reactor, for example, a liquid metal fast breeder reactor (LMFBR), which utilizes a large number of fuel pins in an active core and which circulates a continuous stream of liquid metal heat exchanging fluid such as liquid sodium past the pins is disclosed herein. This system first collects a combined sample of the fluid just as the latter passes through at least a selected group of containers, each housing a plurality of the fuel pins. This combined sample is detected for the presence or absence of a predetermined contaminant, specifically neutrons, resulting from the failure (break) in one or more of the fuel pins. In the event that the contaminant is detected in the combined sample, individual samples of fluid are collected, one at a time, as the fluid just passes through the selected group of containers. These individual samples are also detected for the presence or absence of the contaminant, thereby indicating the fuel pin container or containers responsible for the presence of the contaminant.

6 Claims, 17 Drawing Figures

FAILED ELEMENT DETECTION AND LOCATION SYSTEM AND METHOD FOR USE IN A NUCLEAR REACTOR

The present invention relates generally to nuclear reactors and more particularly to a failed element detection and location (FEDAL) system and method for use in a nuclear reactor and specifically an LMFBR.

The particular nuclear reactor disclosed herein is one which utilizes a number of fuel assemblies housed within an active core which, in turn, is housed within a sealed vessel. Each fuel assembly contains the reactor's fuel or fission products, that is, the active substance making up the reactor, such as plutonium oxide. This active substance is sealed within a relatively large number of elongated hollow pins (cladding) located within an opened container having an inlet and outlet. Each of these containers and associated fuel pins comprise a single fuel assembly and all of the assemblies are located within the active core. The reactor also includes liquid metal cooling fluid such as liquid sodium and means for circulating a stream of the fluid along a path, a section of which passes through the containers from their inlets to their outlets. Obviously, this particular type of reactor includes other components, which may be conventional like those thus far described but which are not necessary to an understanding of the present invention. Accordingly, these other components will not be discussed or even mentioned herein, unless to do so would be helpful to an understanding of the present invention.

In nuclear reactors of the type described, it is often desirable, if not necessary, to monitor for cladding failures, that is, breaks in the hollow fuel pins comprising part of the fuel assemblies. If this break is relatively small, the passing fluid, specifically the sodium, may not come in contact with the active substance within the pin, for example the plutonium oxide. However, inert gases including specifically Kr-85, Kr-88 and Xe-133, Xe-135 will escape into the fluid stream, emitting gamma rays therefrom. On the other hand, if the break is relatively large, that is, sufficiently large to cause the passing sodium to actually enter the faulty pin and contact the plutonium oxide, the sodium will be contaminated with I-137 and Br-87 which are two of a number of by-products of the fissioning process taking place in the pin and which decay rather rapidly, giving off neutrons. The detection of small breaks is relatively conventional and typically accomplished by detecting for gamma rays emitted from the escaping gases Kr-85, 88 and the like as the latter surface from a central pool of sodium within the reactor vessel. However, accurate and reliable detection of the larger breaks in a reliable manner is not as simple, as will be seen hereinafter.

One typical way of monitoring for large breaks heretofore has been to place a neutron detector at some entry point in the internal heat exchanger (IHX) which also comprises part of the overall reactor and which is located within the reactor vessel for receiving liquid sodium after the latter passes out of the fuel assembly and into the central pool. There are several problems with this approach. First, it may not be possible to locate the monitoring apparatus in a position to collect samples of sodium which have passed through all of the core assemblies because of the size of the IHX and the diverse ways in which the sodium enters the latter. Second, the time it takes for the sodium to reach the IHX bulk sodium pickup point within the central pool is relatively long. This means that by the time these contaminants are detected for the emission of neutrons, the level of neutrons being emitted will be relatively low thereby raising the question of reliability. For example, the half life for I-137 is approximately 55 seconds and for Br-87 it is approximately 22 seconds. In contrast to this, it may take as long as 150 seconds for a particular sample of sodium to reach the selected entry point of the IHX from the reactor core.

Another way in which the relatively larger breaks in fuel pins have been detected in the past has been to individually sample each fuel assembly, one at a time, which can certainly be reliable. However, it is time consuming and costly to provide continuous individual monitoring of all of the fuel assemblies since a given core may be made up of as many as 600-700 such assemblies.

As will be seem hereinafter the present invention provides for a particular FEDAL approach for use in a nuclear reactor of the type described without the previously recited drawbacks. Rather, as will also be seen, combined samples of liquid sodium are collected as soon as the latter passes through selected groups of fuel assembly containers while the neutron emission level of any collected contaminants is still relatively high, thereby making this approach reliable. Should there be an indication of a break, individual samples are then and only then taken to isolate the fuel assembly or assemblies responsible for the break. In this way, individual samples do not have to be continuously collected and detected as in the past.

In view of the foregoing, one object of the present invention is to provide a reliable and yet economical FEDAL technique for use in a nuclear reactor of the type described above.

A more particular object of the present invention is to provide a reliable technique of detecting for relatively large breaks in the previously described fuel pins wherein combined samples of sodium are collected at the outlets of selected fuel pin containers while the neutron emission level of the contaminants, if any, are still relatively high.

Another particular object of the present invention is to collect individual sodium samples only if the combined sample indicates a break in one or more fuel pins.

A further object of the present invention is to provide a FEDAL system which utilizes an uncomplicated and reliable valve assembly for collecting both combined sodium samples as well as individual samples.

As stated previously and as will be seen hereinafter, particular FEDAL technique disclosed herein is one which is especially suitable for use in a particular type of nuclear reactor, specifically an LMFBR. As also stated, this type of reactor has a reactive core housing within a vessel and a plurality of fuel assemblies housed within the core. Each of these fuel assemblies includes an open container having an inlet and outlet and active substance such as plutonium oxide sealed within a relatively large number of elongated hollow pins located within the container. This reactor also includes liquid metal cooling fluid such as liquid sodium and means for circulating a stream of the fluid along a path, a section of which passes through the containers from their inlets to their outlets.

As will be seen hereinafter, the particular technique disclosed is one which detects breaks in the hollow fuel pins of sufficient size to cause at least one predetermined contaminant to pass into the liquid metal cooling stream as the latter passes through the containers. In accordance with this technique, a combined sample of the liquid metal fluid is collected at the outlets of at least a group of the fuel assembly containers and detected for the presence or absence of the contaminant. If this combined sample indicates the presence of a break, individual samples of the fluid are selectively collected, one at a time, at the outlets of the fuel assembly containers in the same group and these individual samples are also detected for the presence or absence of the contaminant, thereby indicating the particular fuel assembly or assemblies responsible for the break.

Figure 1:
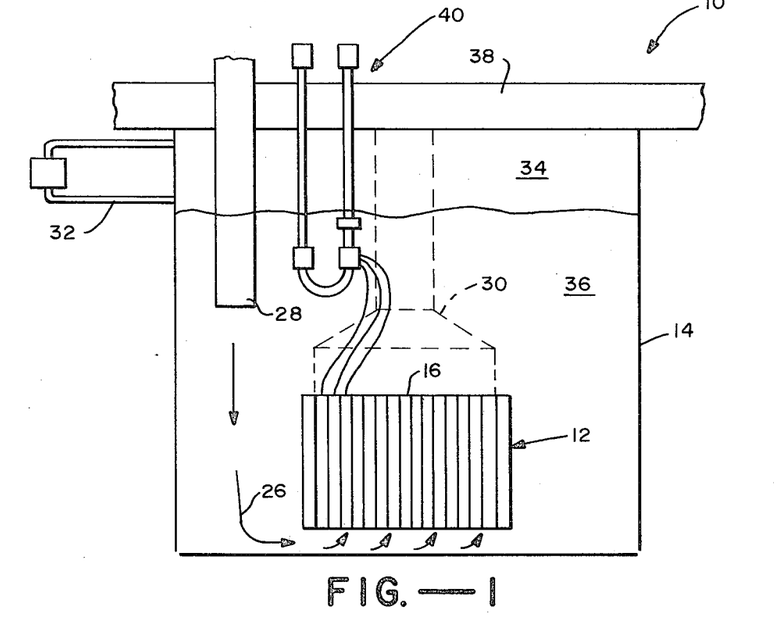
FIG. 1 is a diagrammatic illustration, in elevational view, of a nuclear reactor including a FEDAL system designed in accordance with the present invention.
Figure 1A:
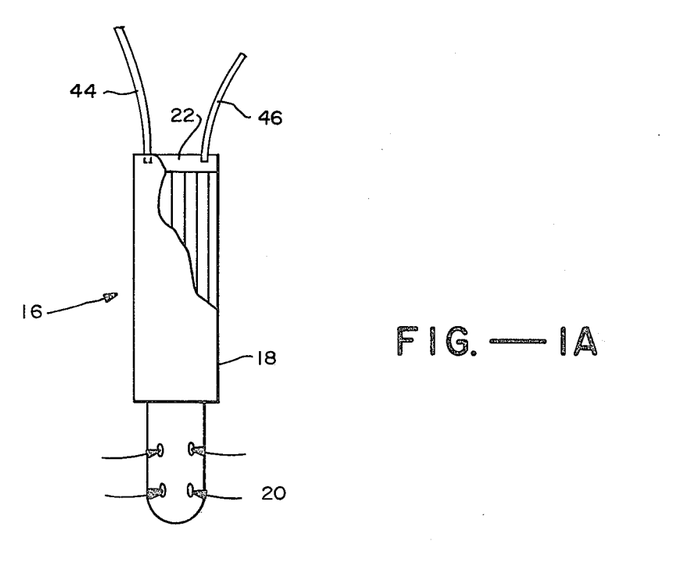
FIG. 1A is a partially broken away side elevational view of a fuel assembly comprising part of the reactor of FIG. 1 as the assembly is connected into the FEDAL system.

Turning now to the drawings, wherein like components are designated by like reference numerals throughout the various figures, attention is specifically directed to FIG. 1 which illustrates, in part, a pool type liquid metal fast breeder reactor generally indicated at 10. As shown, reactor 10 includes an active core 12 housed within a vessel 14. A plurality of fuel assemblies 16 are housed within the core and each includes an opened container 18 having inlets in the form of through-holes 20 at the bottom end and an opened outlet 22 at its top end as seen in FIG. 1A. An active substance such as plutonium oxide is sealed within a large number of elongated hollow pins 24 located vertically adjacent one another within the container. These pins are preferably constructed of stainless steel but are nevertheless subject to cracking or breaking in the manner described previously. Reactor 10 also includes liquid metal cooling fluid, specifically liquid sodium and conventional means (not shown) for circulating a stream of the fluid along a path indicated by the arrows 26. As best seen in FIG. 1A in conjunction with FIG. 1, this path includes a section which passes through each of the fuel assembly containers from their inlets 20 to their outlets 22.

All of the reactor components thus far described are conventional and therefore will only be described to the extent necessary for a full and complete understanding of the present invention. In this regard, it is to be understood that the reactor includes other conventional components such as a conventional internal heat exchanger (IHX) generally indicated at 28, a lower instrumentation section 30 or instrument tree as it is more commonly called and a clean-up loop 32 for the cover gas, typically argon or helium, which collect in the gap 34 between a central pool of sodium 36 and a reactor cover 38.

In addition to the various conventional components recited above as well as those not recited, nuclear reactor 10 also includes a failed element detection and location (FEDAL) system which is designed in accordance with the present invention and which is generally indicated by the reference numeral 40 in FIG. 1. As stated previously, should one or more of the plutonium oxide containing fuel pins 24 display a break which is sufficiently large to cause some of the passing sodium to contact the plutonium oxide, a number of contaminants will enter the stream including I-137 and Br-87, both of which decay giving off neutrons. As will be seen hereinafter, FEDAL system 40 is provided for detecting which particular fuel assembly or assemblies include a faulty pin or pins. As will also be seen systems 40 accomplishes this in a reliable and economical way by first collecting a combined sample of the sodium at the outlets of at least a group of the fuel assembly containers 18. In this regard, a number of systems 40 may be used to monitor all of the fuel assemblies, which is the preferred approach where there are a relatively large number of such assemblies. However, a single system may be used to monitor all of the fuel assemblies in a given reactor. In either case, once a combined sample is collected from the system or systems, each sample is tested for the presence or absence of neutrons, thereby indicating the presence or absence of a break in at least one pin of the associated group of fuel assemblies. In the event a combined sample does indicate a break and preferably only in this event, each system 40 collects individual samples of the sodium, one at a time, at the outlets of the fuel assembly containers in the associated group and these individual samples are detected for the presence or absence of neutrons, thereby indicating the particular fuel assembly or assemblies which have failed.

Figure 2:
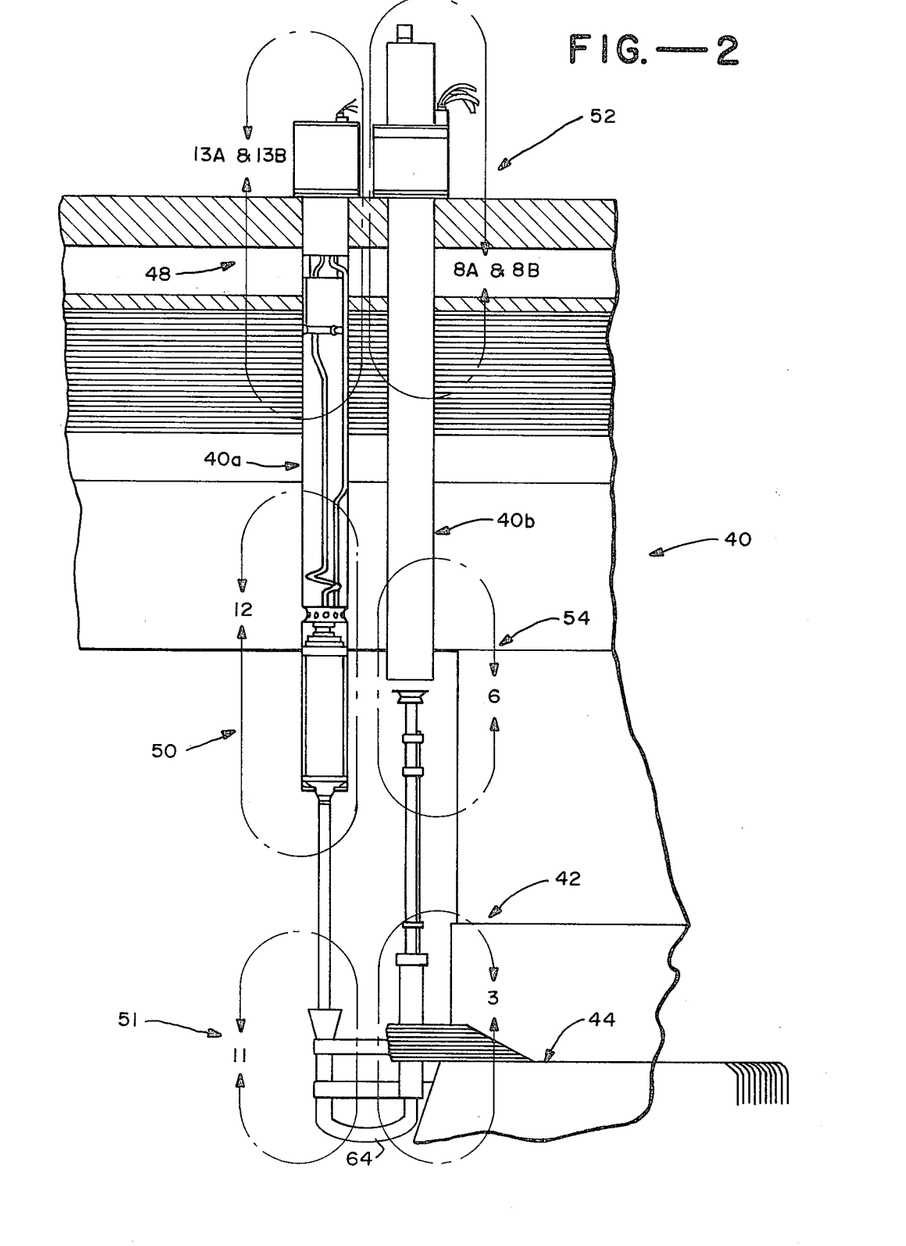
FIG. 2 is an enlarged side elevational view of the FEDAL system of FIG. 1.

Turning to FIG. 2, attention is now directed to a detailed discussion of one of the FEDAL systems 40. This system includes as a primary component a valve assembly 42 which serves to collect samples of liquid sodium at the outlets 22 of a selected group of fuel assemblies 16 by means of a network of sipper tubes 44. As best seen in FIG. 1A an individual sipper tube extends into the opened top end of each fuel assembly container 18 within the selected group of assemblies, alongside a thermocouple 46 which is typically provided as part of instrument tree 30. As will be seen hereinafter, valve assembly 42 also serves to combine the sodium collected through all of its sipper tubes for providing a single combined sample. Moreover, it also serves to collect individual samples of the sodium, one at a time, at the outlets of the fuel assembly containers. The combined sample is drawn up through one leg 40a of system 40 to and through a neutron detection section 48 by a pumping section 50 and initially through a slip section 51. The individual samples are drawn up a second leg 40b of system 40, one at a time, to and through a second neutron detection section 52 by a second pumping section 54. As will be seen hereinafter, neutron detection section 52 also serves as part of valve assembly 42.

From an operational standpoint, valve assembly 42 operates on a regular basis to continuously successively collect combined sodium samples which are drawn through detecting section 48 and thereafter into sodium pool 36. During this procedure, the successive samples are continuously monitored for neutrons. So long as none are detected, it is assumed that no breaks exist in the monitored fuel pins and individual samples are not collected. However, should there be an indication of neutrons above a predetermined background level, readily selected by the operator, a valve assembly 42 begins collecting individual sodium samples, one at a time, and these samples are passed through their neutron detection section 52 and eventually into sodium pool 36. In this way, each individual sample is detected for neutrons so as to isolate which fuel assembly or assemblies are responsible for an indicated break. In this regard, conventional control circuitry (not shown) is provided for automatically collecting individual samples in the event this is warranted in view of the combined sample. This may be accomplished by connecting the neutron detector which comprises part of section 48 and which will be described hereinafter with the mechanism for controlling valve assembly 42 and section 52, also to be described hereinafter.

Figures 3, 4, 5:
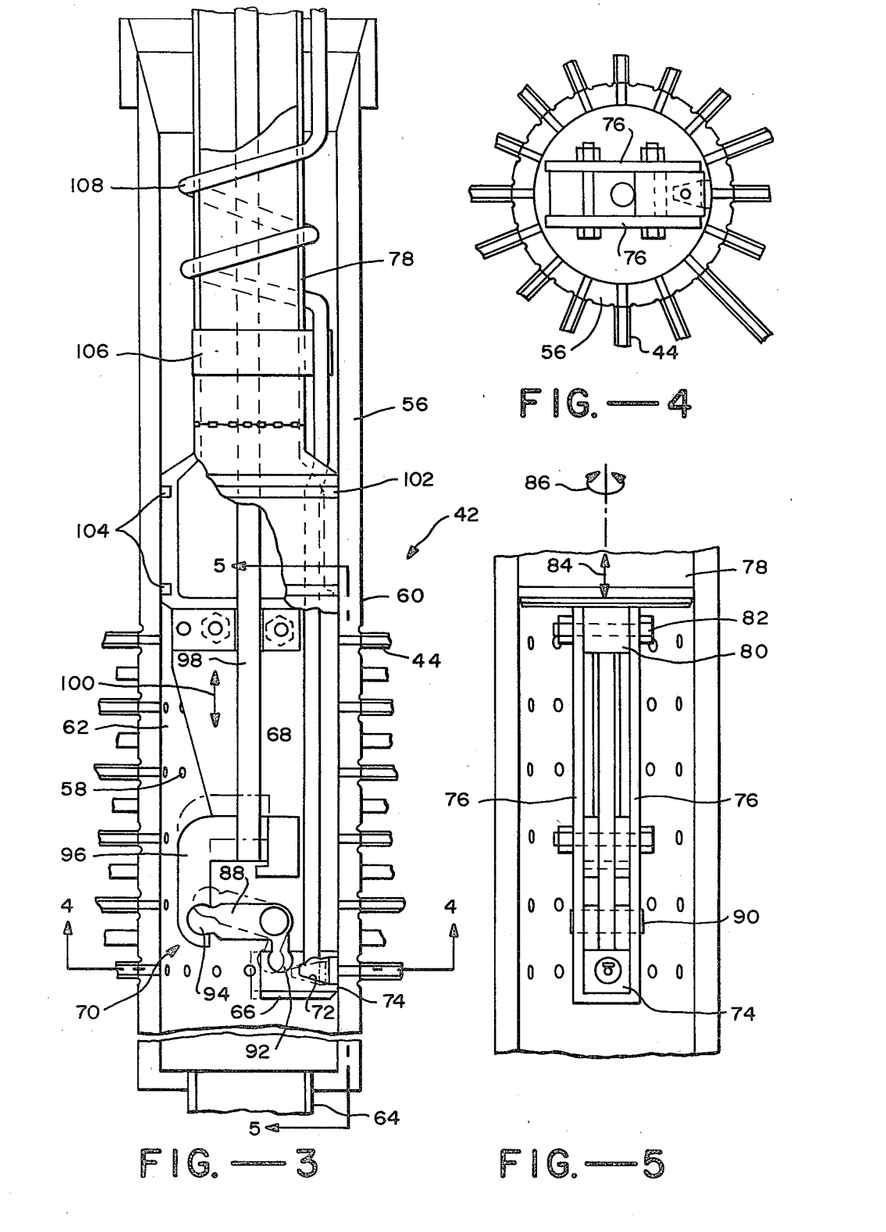
FIG. 3 is a sectional view of one part of the system illustrated in FIG. 2 taken generally about line 3 in FIG. 2.
FIG. 4 is a sectional view taken along line 4—4 in FIG. 3.
FIG. 5 is a side elevational view taken generally along line 5—5 in FIG. 3.

Having described FEDAL system 40 as a whole, attention is now directed to its various components starting with valve assembly 42. As illustrated in FIGS. 3–5, the valve assembly includes an elongated housing 56 which comprises part of leg 40b and which includes a series of spaced through-holes or openings 58 extending from its outer surface 60 to its inner surface 62. These spaced through-holes correspond in number to the outlets 22 in the selected fuel assemblies and are in fluid communication with the outlets by means of previously described sipper tubes 44. As best seen in FIG. 3, sodium from the selected fuel assemblies is drawn into housing 56 through the sipper tubes and associated openings 58 and mixed within the housing to form a single combined sample which is drawn out of the bottom of the housing through a U-shaped coupling tube 64 for passage into leg 40a, as will be discussed hereinafter.

In order to collect individual samples of fluid from the various fuel assemblies, valve assembly 42 includes a valve head 66, a cooperating collection tube 68 and an arrangement 70 for moving the valve head and its associated collection tube between the various openings 58, one at a time, for collecting individual samples of fluid passing through the sipper tubes 44. The valve head itself includes a fluid sample receiving cavity 72 which opens out to a front wall engaging surface 74 and which is in fluid communication with the bottom of collection tube 68. The front face 74 of the valve is adapted for engagement with inner surface 62 of the valve housing around individual openings or through-holes 58 for placing cavity 72 in fluid communication with the sipper tubes 44, one at a time. In this way, an individual fluid sample from an associated fuel assembly passes into valve head cavity 72 and is drawn up tube 68, eventually to neutron detection section 52, as will be discussed hereinafter. Arrangement 70 is provided for placing the valve head in fluid communication with each of the sipper tubes, one at a time, and in accordance with the present invention this is accomplished without dragging valve head face 74 across the inner housing surface 62 as the valve head moves between through-holes 58.

As seen best in FIGS. 4 and 5, arrangement 70 includes two primary support plates 76 which depend from the underside of a hollow, vertically extending drum 78 and is fixably connected to the drum by a center flange 80 and bolts 82. As will be described hereinafter, this drum and the two sideplates are movable up and down as indicated by two-way rotational arrow 86 (FIG. 5). Valve head 66 is mounted for movement with the two side plates by means of an angled connector 88 located between the two plates and pivotally connected thereto by means of pivot pin 90. The lowermost end 92 of angle connector 88 is spherical and comprises part of a ball and socket joint connection between the connector and the valve head. The rearwardmost end of the end connector is also spherical and comprises part of a second ball and socket connection between the connector and a second angled connector 96. This latter connector is fixably attached to the bottom end of a vertically upwardly extending shaft 98 extending up leg 40b coaxially through drum 78. As will be seen hereinafter, center shaft is movable up and down, as indicated by two-way arrow 100 (FIG. 3), independent of the reciprocating and rotational movement of drum 78 and side plates 76.

The exact way in which drum 78 is reciprocated and rotated and the way in which center shaft is reciprocated will be discussed below. For the moment, it should suffice to point out the purpose of these different movements. In the first place, it should be apparent that valve head 66 must be moved between the lowermost position shown in FIG. 3 where it is in horizontal alignment with the lowermost through-holes 58 and associated sipper tubes and an uppermost position in horizontal alignment with the uppermost through-holes 58 and associated sipper tubes. This is accomplished by selectively moving the drum 78 between these two positions in the direction of arrow 84. It should be equally apparent that the valve head must be rotated about the axis of housing 56 since the various through-holes circumscribe the housing. This is accomplished by rotating drum 78 about its own axis (arrow 86). With the valve assembly thus far described, the valve head itself could be moved between all of the through-holes for fluid engagement therewith. However, this would mean that the front face 74 of the valve head would have to slide across the inner surface 62 of the housing subjecting it to wear and the overall valve head to undue physical strain.

In accordance with the present invention, the valve head is displaced back from inner surface 62 during movement between through-holes by means of the two angles connectors 88 and 90 and center shaft 98. Specifically, when the two angles connectors and the shaft are in the position shown by solid lines in FIG. 3, valve head face 74 engages inner surface 62, placing cavity 72 in fluid communication with an associated through-hole. However, when the shaft is moved upward (arrow 100) this causes the angled connector 96 to move upward, as indicated by dotted lines. This in turn causes the angled connector 88 to pivot clockwise about pin 90, as viewed in FIG. 3, thereby causing the valve head itself to move away from inner surface 62. The valve head is maintained in this latter position as drum 78 moves between the through-holes and is placed back in its solid-line position upon reaching a selected through-hole.

As best seen in FIG. 3, drum 78 includes a lowermost enlarged head 102 which is sized to just slideably fit within the inner surface of housing 56 and includes end seals 104 for preventing sodium from entering the housing and passing up between the inner surface of the latter and the enlarged head. As will be seen in the later figures, the rest of drum 78 which is centrally supported at its lower end by an anchor band 106 extends all of the way up to section 52 in loop 40b. On the other hand, tube 68 which rotates with the drum only extends up to section 54 where it meets and is maintained in fluid communication with a stationary tube extending up to section 52. In order to compensate for thermal expansion, tube 68 includes a helical section or coil 108 extending around drum 78.

Figures 6, 7:
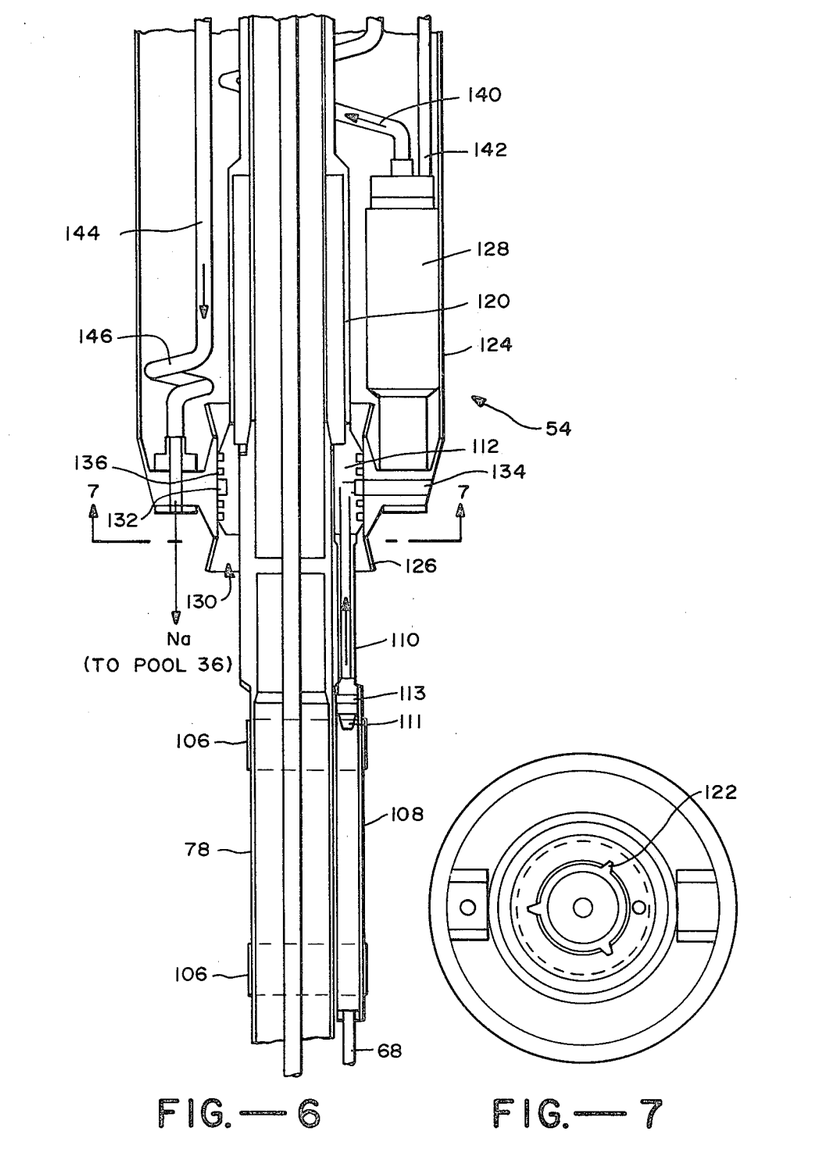
FIG. 6 is a side elevational view of another part of the assembly illustrated in FIG. 2, taken generally about line 6 in FIG. 2.
FIG. 7 is a sectional view taken generally along line 7—7 in FIG. 6.

Moving up loop 40b, attention is now directed to pump section 54 which is best seen in FIGS. 6 and 7. However, it should first be noted that previously described drum 78 extends into and through this pump section where it rotates and reciprocates relative thereto and is supported by additional anchor bands 106. These anchor bands also serve to support an extension section 108 of tube 68 which interconnects the tube to still another tubular section 110. The latter section 110 is fixed vertically (but not rotationally), as will be seen hereinafter, while section 108 is movable both vertically and rotationally with tube 68 and the drum 78 and serves to compensate for such movement. In this regard, the lowermost end of section 110 includes a nozzle 111 including seal rings 113 slidably moving in a sealed manner within section 108 as the latter moves up and down with tube 68.

As best seen in FIG. 6, drum 78 extends through an alignment and centering ring 112 which extends all the way up to top section 52, as will be seen hereinafter. This alignment and centering ring is interconnected for rotational movement with the drum (but not vertical movement) by means of three splines 122 and cooperating grooves, seen best in FIG. 7. Both the alignments and centering ring and drum extend through a stationary outer housing 124 through a flared opening 126. This housing contains a relatively slow flow pump 128 which serves to circulate individual sodium samples (which have been collected at the valve assembly) through neutron detection section 52 and back out into the sodium pool 36. It should be noted that pump 128 is fixed in place just inside housing 124 and hence is also stationary.

Since pump 128 is fixed and tube section 110 is movable rotationally along with ring 112, it is necessary to provide a suitable connection between the pump and section 110. This is accomplished by means of a connecting joint 130 comprising part of alignment and centering ring 120 and housing 124. This connection includes an angular recess 132 around the outer periphery of a thickened section of alignment and centering ring. This annular recess is at all times maintained in fluid communication with section 110 of tube 68 by locating the tubular section through the thickened portion of the ring, as seen in FIG. 6. At the same time, housing 124 includes a stationary ring 134 extending around recess 132, the latter being sealed against upward or downward leaks by additional piston rings 136. However, ring 134 includes a fixed passage 138 in fluid communication with recess 132. In this way, even though the alignment and centering ring 120 rotates with drum 78, fluid communication is maintained between the tube section 110 and pump 128 by means of connection 130. As a result, the upper tube section 140 extending out the back or top side of the pump is merely an extension of the tube 68 and, as will be seen hereinafter, extends all the way up to neutron detection section 52. In this regard, a suitable pump power cable 142 also extends up to this latter section with tube section 140. Moreover, as seen in FIG. 6, the tube section 140 includes at least one coil turn providing for thermal expansion. As also seen in this figure, a second tube 144 is shown within housing 124 and, as will also be seen hereinafter, this latter tube extends from neutron detection section 52. Actually, this latter tube is a continuation of the tubes 68 and 140 and provides a return for the flow of sodium to pool 36. Down tube 144 also has a helical coil section 146 to compensate for thermal expansion.

Moving up to the top of loop 40b, attention is now directed to FIGS. 8A and 8B and FIGS. 9 and 10 for a detailed description of neutron detection section 52. As will be seen hereinafter, this section is not only responsible for detecting neutrons from individual sodium samples but also provides the appropriate drive means for reciprocating and rotating the previously described drum 78 comprising part of the valve assembly and for reciprocating center shaft 98. In addition, this section provides a conventional sparger scheme for analyzing helium and argon gas emitted into the sodium stream as a result of fuel pin breaks.

Figure 8A:
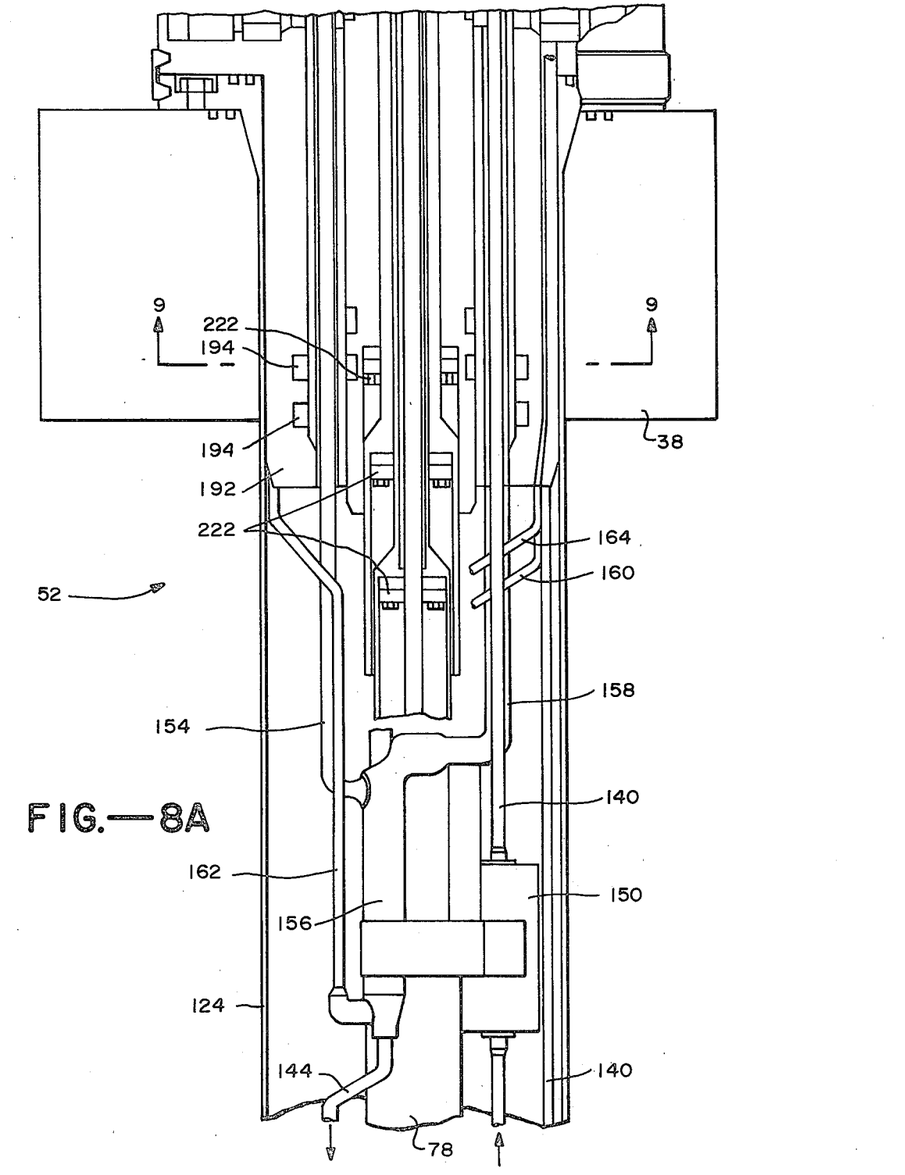
FIGS. 8A and 8B together comprise a side elevational view of still another part of the system illustrated in FIG. 2, taken generally along line 8A, 8B in FIG. 2.

Referring first to FIG. 8A, it should be noted at the outset that the previously described drum 78 continues up through housing 124 along with tube 140 and down tube 144. Tube 140 includes an in-line flow meter 150 but otherwise extends without interruption up to the top of the section 52 where it makes a series of helical turns so as to provide a neutron detecting coil 152 seen in FIG. 8B. This helical section or coil provides a concentrated or relatively large amount of sodium in a relatively small area for detection by suitable neutron detecting means to be described hereinafter. The other end of this helical section connects to a straight section 154 (see FIGS. 8A and 8B) which actually comprises part of the down tube 144. As seen best in FIG. 8A, section 154 extends all the way down to a sparger 156 having its down spout connected to previously recited down tube 144. In this manner, individual samples of sodium pumped up through tube 140 from previously described tube 68 pass through the helical section 152 and thereafter down section 154, through sparger 152 and out into the sodium pool through down tube 144. The sparger itself may be conventional and is provided for collecting gases from the sodium as the latter passes through its loop. These gases are specifically collected at the sparger by means of a gas to analyzer tube 158 extending from the sparger to a gas analyzer (not shown). A vacuum and helium purge tube 160 is also connected to the top of the sparger and to a source of vacuum (also not shown). The sparger gas, once having been analyzed, is returned to the sparger through a return tube 162 connected to the bottom of the sparger at one end and, while not shown, to the gas analyzer at the other end. A second return tube, specifically tube 164, is provided for returning sodium back into the sparger.

Figure 8B:
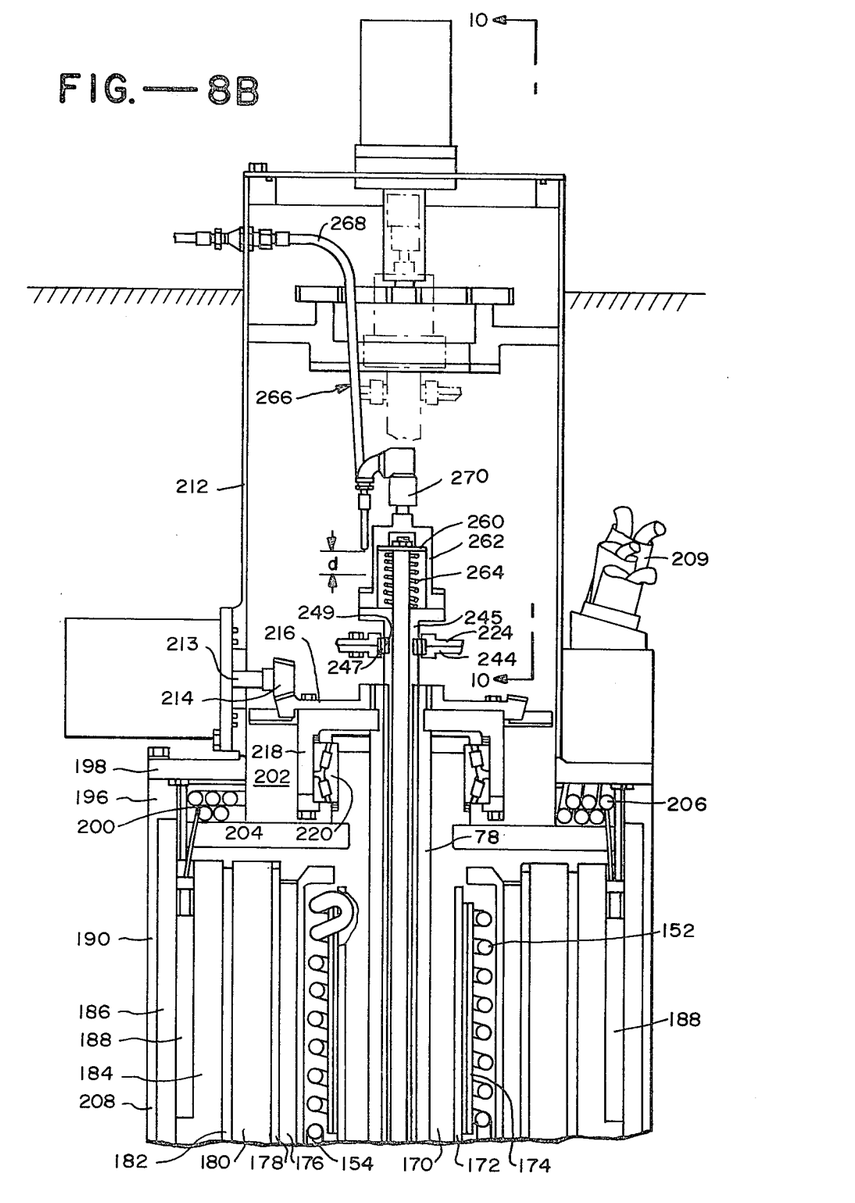
Figure 9:
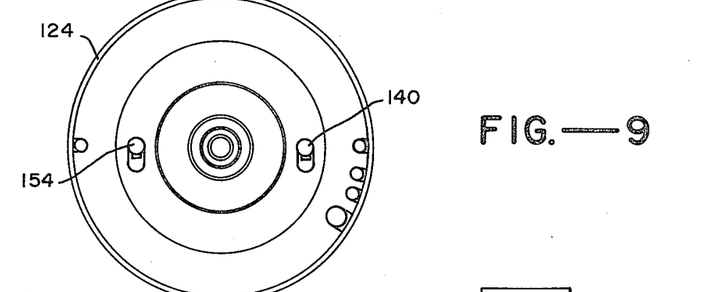
FIG. 9 is a sectional view taken generally along line 9—9 in FIG. 8A.

Referring specifically to FIG. 8B, it can be seen that coil 152 extends around a section of drum 78 with an inner housing 170 to be described hereinafter located therebetween along with a cylindrical layer of insulation 172 and a heater 174. In addition, a second insulation layer 176 is located concentrically around coil 152 followed by a concentric gas containing layer 178 which is in turn followed by a layer of lead shielding 180 and another layer of contained gas 182. Over this latter layer of contained gas is a layer of graphite 184. Between this layer of graphite and another layer of borated graphite 186 are $He^3$ counters 188 for detecting neutrons. All of these components are contained within an outer housing 190 which extends from a bottom 192 end (FIG. 8A) including end seals 194 to an upper end 196 engaging against the underside of a top plate 198. A manifold 200 is defined between this top plate, housing 196 for both a lead shielding ring 202 and a second layer, actually ring, of borated graphite 204. The manifold 200 is provided for housing the conduit 206 associated with counter 188. All of these various components are housed within an outermost shell 208. An interface 209 is provided for purge gas, instrumentation power, controls, gas specimen, sparger gas, etc.

For the most part, the remaining components comprising part of overall section 52 in system 40 are those associated with reciprocating and rotating drum 78 and reciprocating center shaft 98. In this regard, attention is first directed to the way in which the overall drum is rotated about its own axis. This is accomplished by utilizing a motor 210 mounted to the outside of a top housing 212. The motor includes a drive shaft 213 which supports a gear 214 for rotation within housing 212. Gear 214 is in turn interlocked for rotation with a larger gear 216 fixedly mounted around drum 78 along with a gear support 218. This latter support lies on a bearing suspension 220 located around inner housing 170. It should be obvious that as gear 214 rotates, the larger gear 216 and its support 218 also rotate causing drum 78 to rotate. The drum is supported along its length for its rotational movement by the previously described means as well as a number of guide rings 222 (FIG. 8A) as well as a top center guide 224 located just above gear 216 (FIG. 8B).

Figure 10:
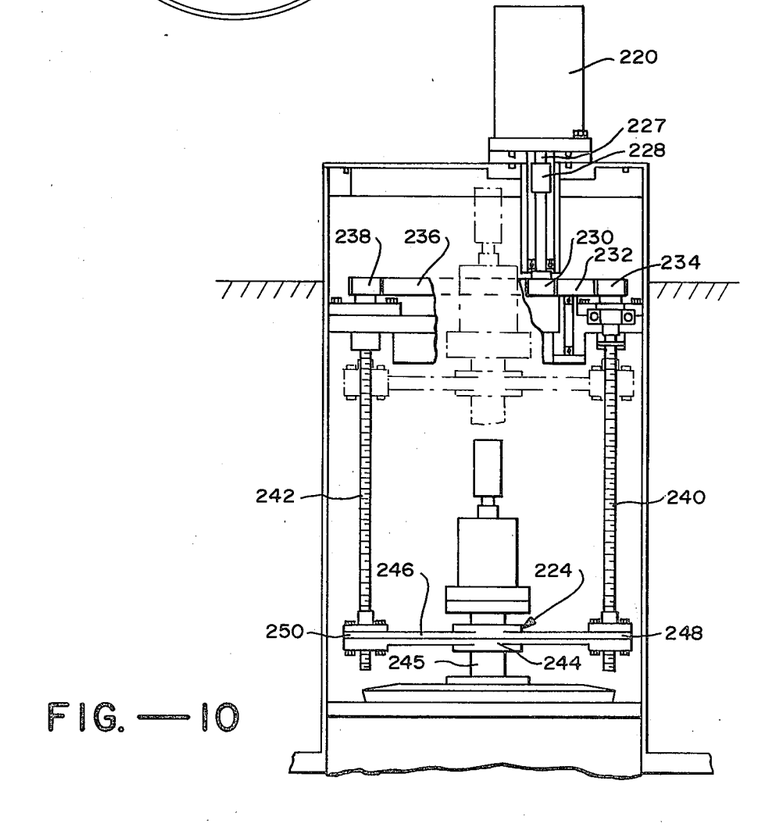
FIG. 10 is a side elevational view taken generally along line 10—10 in FIG. 8B.

The exact way in which the overall drum reciprocates is slightly more sophisticated than the way in which it rotates and to more fully appreciate how this is accomplished reference is particularly made to FIG. 10 in conjunction with FIG. 8B. As seen in both of these figures, top housing 212 supports a second drive motor 226 on its top surface. This motor includes a drive shaft 227 carrying a coupling 228 and a central gear 230 located within the top housing. Gear 230 drives an adjacent torque distributor 232 which, in turn, drives an outer pinion gear 234. The central gear 230 also drives a larger torque distributor 236 which drives a second outer pinion gear 238. The two outer pinion gears 234 and 238 drive associated push-pull threaded suspension rods 240 and 242, respectively. These two rods in turn support previously described center guide 224 which includes a center bearing ring 244 positioned concentrically around an uppermost segment 245 of drum 78. This bearing ring is fixedly interlocked with drum segment 245 vertically while allowing the drum to rotate about its own axis relative thereto and to accomplish this uses vertical cylinder bearings 247 located within cooperating notches 249 as seen in FIG. 8B. The guide ring also includes moment equalizing arms 246 and two outer connectors 248 and 250 in threaded connection around the two rods 240 and 242, respectively. Functionally, as the two outer pinion gears 234 and 238 rotate, they cause the two rods to rotate for moving the guide ring between its solid line lowermost position shown in FIG. 10 and its uppermost dotted line position shown in the same figure. This in turn moves the drum between its two extremes for moving the valve head 66 between the lowermost through-holes 58 and the uppermost through-holes.

Having described the way in which drum 78 is both rotated and reciprocated, attention is now directed to the way in which the center shaft 98 is reciprocated as will be best seen in FIG. 8B. This is accomplished by providing a fixed flange 260 fixedly connected to the top of the center shaft within the sealed housing section 262. The overall shaft is slidably movable relative to this housing which means that top section of the shaft and the flange 260 are movable between the uppermost position shown in FIG. 8B and a slightly lower position so that the flange itself is actually movable through a distance d. However, the entire center shaft including flange 260 is maintained in its upper position by means of a spring member 264 positioned concentrically around the contained section of the center shaft, between the floor of housing 262 and flange 260. In this way, valve head 266 is biased in its non-fluid communicating dotted line position illustrated in FIG. 3 so that front face 74 of the valve head is out of engagement with surface 62 of housing 56. In order to place the valve head in fluid communication with a selected one of the through-holes, the center shaft must be moved to its lowermost position through the distance d. This is accomplsiehd by arrangement 266 which applies pressurized gas into housing 262 just above flange 260, causing the latter to move down the distance d. This arrangement includes a source of pressurized gas (not shown) which is delivered through a hose connection 268 into housing 262 through a rotary joint 270. A suitable release valve (not shown) is used to release the pressure within the housing just above the flange 260 when it is desirable to move the drum back to its spring biased position.

Figure 11:
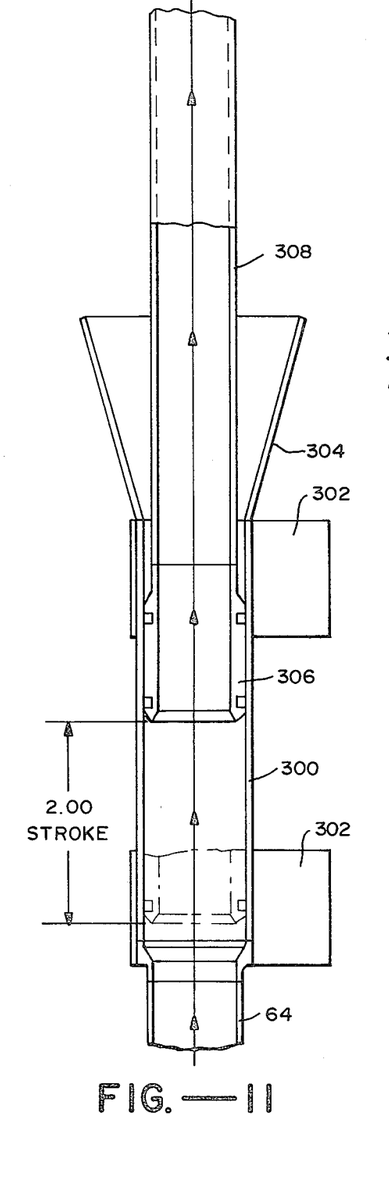
FIG. 11 is a side elevational view of yet another part of the system illustrated in FIG. 2, taken generally about line 11 in FIG. 2.

Having described leg 40b in overall FEDAL system 40, attention is now directed to leg 40a which is interconnected with leg 40b by means of previously described U-shaped coupling tube (see FIGS. 2 and 3). In this regard, it may be recalled that previously described valve assembly 42 served a number of functions including collecting a combined sample of sodium. This combined sample is passed through tube 64 into lowermost section 51 of leg 40a, as best shown in FIG. 11. This section includes a central guide or instrument tree stroke sleeve 300 fixedly supported in place by means of bracket 302 which also supports previously described section 42. The sleeve fixedly receives at its bottom end the otherwise free end of tube 64. However, its top end includes a lead-in cone 304 and is suitably dimensioned to receive the enlarged lowermost end 306 of an intermediate tubing 308 comprising a bottom of leg 40a. In this way, the entire section 308 including its bottom enlarged end 306 is movable vertically between the solid line position shown in FIG. 11 and its dotted line position in response to and as a result of the necessary stroke of previously mentioned instrument tree 30 (see FIG. 1).

Figure 12:
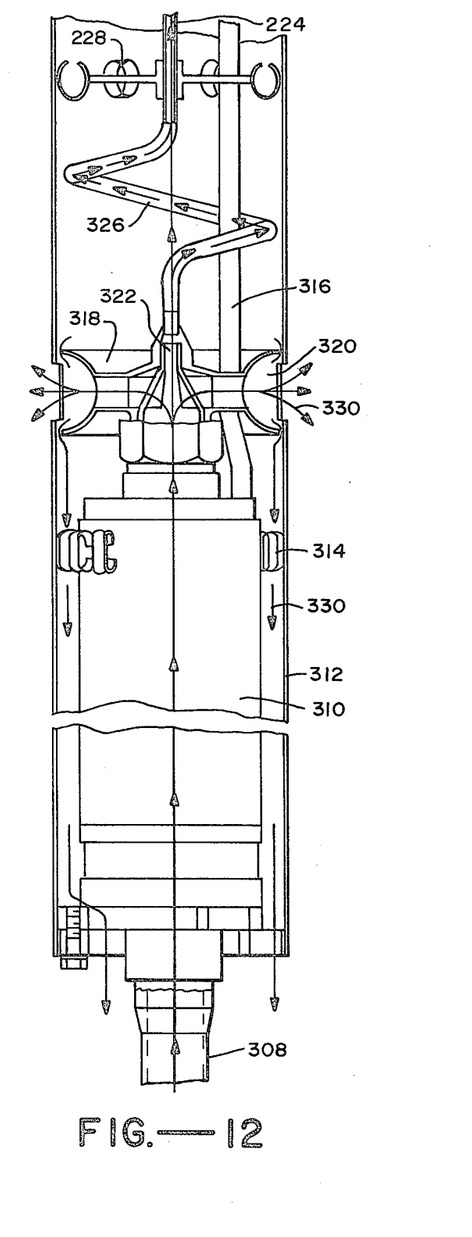
FIG. 12 is a side elevational view of still another part of the system illustrated in FIG. 2, taken generally about line 11 in FIG. 2.

Section 308 extends all the way up to the bottom of pumping section 50 which is shown in FIG. 12. Note that section 308 feeds directly into the bottom of a pump 310 located within an outer housing 312 and centered therein by suitable centering clips 314. This pump preferably has a higher flow rate capability than previously recited pump 128 (see FIG. 6). In fact, in a preferred embodiment, pump 310 is provided for maintaining a flow rate of about 500 gal./minute whereas pump 128 need only maintain a flow rate of about 3 gal./minute.

The top of pump 310 includes its power cable 316 extending up to top section 48 and a two-way valve 318. This valve includes an overflow manifold 320 and a central orifice 322 in fluid communication with the bottom of a sodium carrying tube 324 including helical section or coil 326 to compensate for thermal expansion. This tube is maintained in a fixed position by a centering and vibration dampering connector 328. From an operational standpoint, pump 310 draws the previously described combined sodium sample up through tube 308 and the pump and into nozzle 318. A certain amount of this sample thereafter passes through central orifice 322 and up tube 324 toward detection section 48. The rest of the collected sample passes back into the central sodium pool 36 through the overflow manifold 320, either outside container 312 or between pump 310 and the container, as indicated by the arrows 330.

Figures 13A, 14:
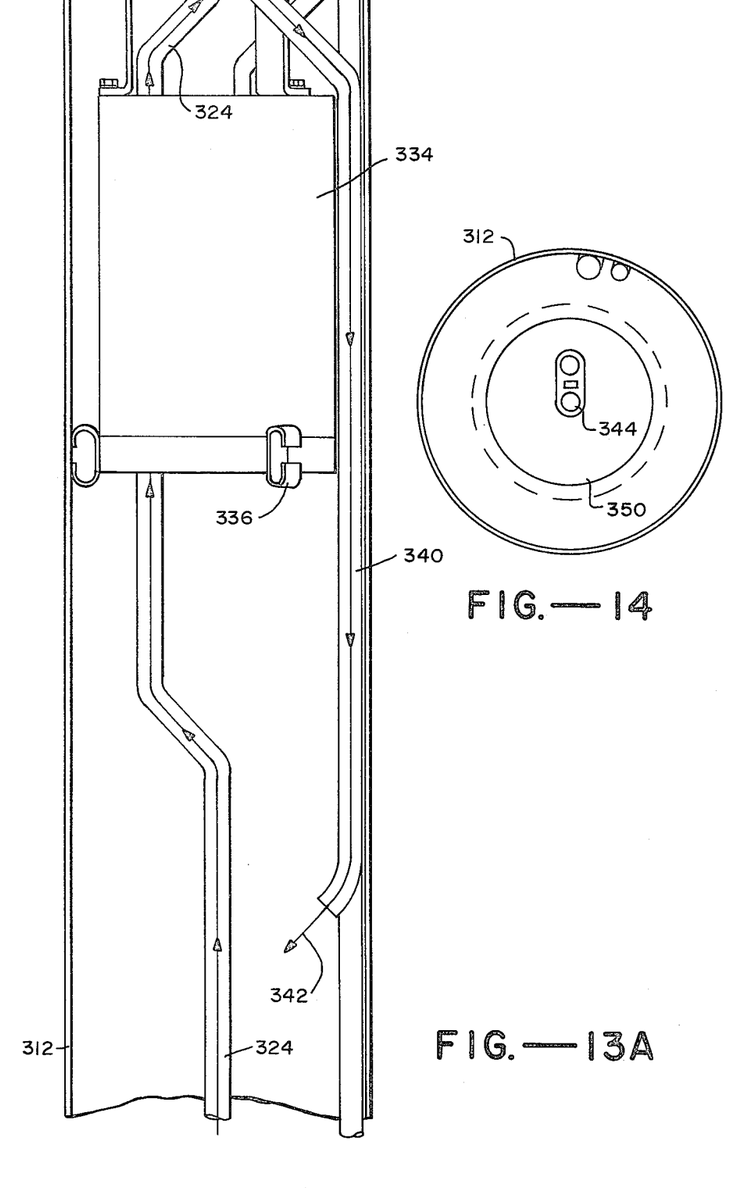
FIGS. 13A and B together comprise a side elevational view of yet another part of the system illustrated in FIG. 2, taken generally about the line 13A, 13B in FIG. 2.
FIG. 14 is a sectional view taken generally along line 14—14 in FIG. 13B.
Figure 13B:
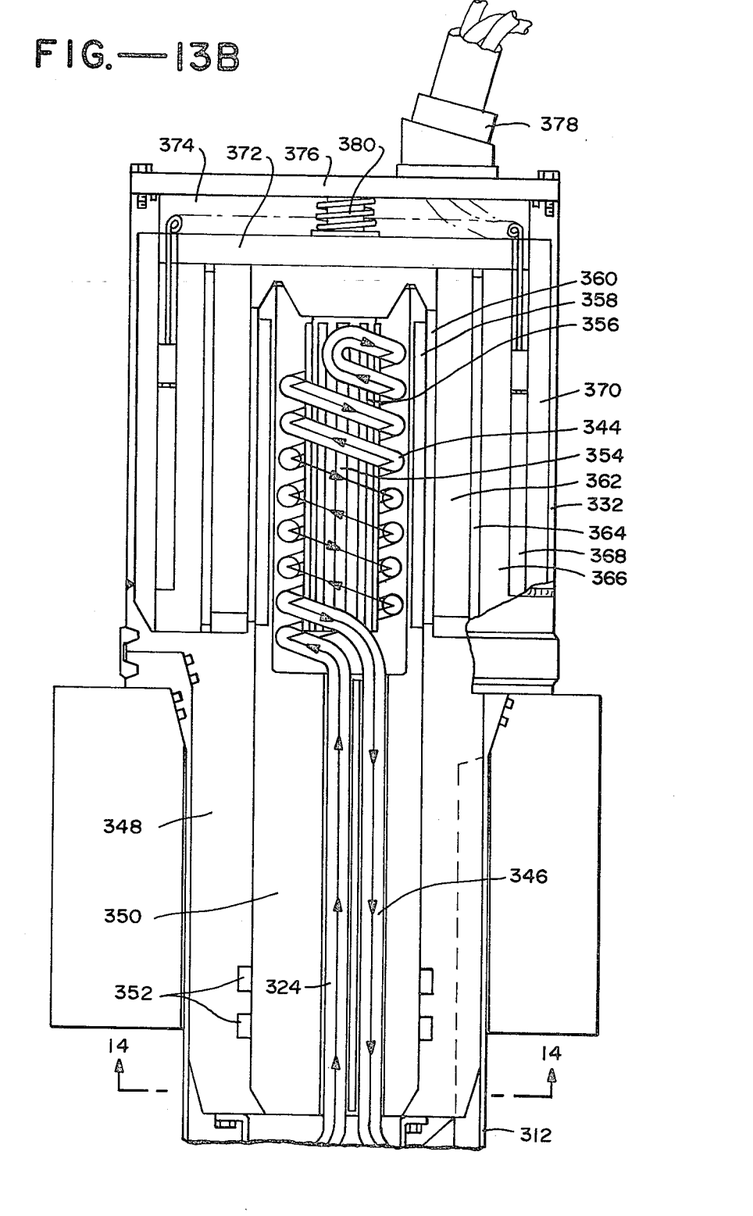

Turning now to FIGS. 13A and B and FIG. 14, attention is directed to detection section 48. As seen first in FIG. 13A, previously described outer housing 312 extends all the way up and through section 48 stopping short of a topmost housing 332 (FIG. 13B). In addition, the sodium carrying tube 324 extends up into section 48 and specifically to the inlet of a flow meter 334 fixedly held within the housing 312 by means of centering and vibration dampening spring members 336. The tube 324 then continues from the outlet of the flow meter up through a detection arrangement which is illustrated in and will be described with respect to FIG. 13B. More specifically, as best seen in this latter figure, the tube 324 connects to one end of a helical section or coil 340 similar to previously described helical section 152 (see FIG. 8B). The other end of this coil joins a down tubing 346 extending down through the detection arrangement (FIG. 13B) and thereafter down past the flow meter 324 (FIG. 13A) where it is directed back into the central sodium pool 36, as indicated by the arrows 342.

Turning specifically to FIG. 13B, the overall detection arrangement referred to above includes a main support made up of an outer section 348 and an inner section 350 sealed between their adjoining surfaces by suitable seal rings 352. The two tubes 324 and 346 extend through the center of the inner section 350. Located within housing 332 is a heater 354 and insulation 356, both of which are located within coil 344. Insulation 358 is also positioned directly around the outside of the coil just inside a gas containing section 360. Outside the gas containing section is a lead shield 362 which in turn has a layer 364 containing gas surrounding it. A layer of graphite 366 surrounds the outer gas layer and an $He^3$ counter 368 is positioned just outside and around this latter layer. Finally, a borated graphite layer 370 and a top borated graphite layer 372 extends over all of these concentric components and defines a conduit manifold 374 between it and the top cover 376. An interface, purge gas, controls, instrumentation and power arrangement generally indicated at 378 is also provided for carrying the various operating cables, lines and the like to their appropriate, remote locations. A pre-load spring 380 is provided in manifold 374 between layer 372 and top cover 376.

We claim:

1. In a nuclear reactor of the type having an internal core housed within a vessel, and a plurality of fuel assemblies housed within said core, each of said fuel assemblies including an open container having an inlet and outlet and an active substance such as plutonium oxide sealed within a relatively large number of elongated hollow pins located within said container, said reactor also including liquid metal heat exchanging fluid such as liquid sodium and means for circulating a stream of said fluid along a path, a section of which passes through said containers from their inlets to said outlets, a system for detecting breaks in said hollow pins, which breaks are of sufficient size to cause at least one predetermined contaminant to pass into said stream of fluid as the latter passes through said containers, said system comprising:

first means including a first pump for collecting a combined sample of said fluid at the outlets of at least a group of said fuel assembly containers;

first means for detecting the presence or absence of said contaminant in said combined sample, whereby to indicate the presence or absence of a break in at least one pin in said group of fuel assemblies;

second means including a second pump having a lower flow rate capability than said first pump for selectively collecting individual samples of said fluid, one at a time, at the outlets of the fuel assembly containers in said group in the event said combined sample detecting means indicates the presence of a pin break said individual sample collecting second means including valve means for collecting said individual samples one at a time, said valve means including a main housing having wall means defining a plurality of spaced openings therethrough, said openings corresponding to and being in fluid communication with the outlets of said group of fuel assembly containers, respectively, a valve head located within said main housing and adapted for positioning in fluid communication with said openings individually, whereby to collect said individual fluid samples, and means for moving said valve head between said fluid communicating positions without engaging the inner surface of said wall means during movement of the valve head between said positions; and second means including a single detector for detecting the presence or absence of said contaminant in each of said individual samples, whereby to indicate the fuel assembly or assemblies responsible for the presence of said contaminant.

2. A system according to claim 1 wherein said moving means includes first means for selectively moving said valve head to a position in confronting spaced relation with any of said openings, a predetermined distance from said inner surface, and second means for moving said valve head between any one of said confronting, spaced positions and a second position in engagement with the inner surface of said wall means surrounding the confronting, spaced positions and a second position in engagement with the inner surface of said wall means surrounding the confronting opening for placing said valve head in fluid communication therewith.

3. In a nuclear reactor of the type having an internal core housed within a vessel, and a plurality of fuel assemblies housed within said core, each of said fuel assemblies including an opened container having an inlet and outlet and an active substance such as plutonium oxide sealed within a relatively large number of elongated hollow pins located within said container, said reactor also including liquid metal heat exchanging fluid such as liquid sodium and means for circulating a stream of said fluid along a path, a section of which passes through said containers from their inlets to their outlets, a valve assembly for use in a system for detecting breaks in said hollow pins, said assembly comprising:

a housing having openings corresponding in number to and in fluid communication with the outlet of at least a group of said fluid assembly containers for simultaneously receiving and combining heat exchanging fluid passing through the outlets of all of the containers in said group; and said assembly also including means for collecting a sample of said combined fluid for passing it to a first contaminant detection location and means for selectively collecting individual samples of said fluid, one at a time, from the outlets of said container group before the fluid is combined in said housing for passing said individual samples to a second contaminant detection location, said individual sample collecting means including a valve head located within said housing and adapted for positioning in fluid communication with said openings, individually, whereby to collect said individual samples, and means for moving said valve head between said fluid communicating positions without engaging the inner surface of said housing.

4. An assembly according to claim 3 wherein said moving means includes first means for selectively moving said valve head to a position in confronting spaced relation with any of said openings, a predetermined distance from the inner surface of said housing, and second means for moving said valve head between any one of said confronting, spaced positions and a second position in engagement with the inner surface of said housing surrounding a confronting opening for fluid communication therewith.

5. In a nuclear reactor of the type having an internal core housed within a vessel, and a plurality of fuel assemblies housed within said core, each of said fuel assemblies including an opened container having an inlet and outlet and an active substance such as plutonium oxide sealed within a relatively large number of elongated hollow pins located within said container, said reactor also including liquid metal heat exchanging fluid such as liquid sodium and means for circulating a stream of said fluid along a path, a section of which passes through said containers from their inlets to said outlets, a method of collecting fluid samples for use in a system for detecting breaks in said hollow pins, said method comprising:

providing a housing having openings corresponding to and in fluid communication with the outlets of at least a group of said fuel assembly containers, for simultaneously receiving and combining heat exchanging fluid passing through all of the containers in said group;

collecting a sample of said combined fluid for passing it to a first contaminant detection location; and under predetermined circumstances, collecting individual samples of said fluid, one at a time, from the outlets of said container group before the fluid is combined in said housing and passing said individual samples to a second contaminant detection location, said individual sample collecting step including locating a valve head within said housing, positioning it in fluid communication with said openings, individually, whereby to collect said individual samples, and moving said valve head between said fluid communicating positions without engaging the inner surface of said housing.

6. A method according to claim 5 wherein said moving step includes selectively moving said valve head to a position in confronting spaced relation with any of said openings, a predetermined distance from the inner surface of said housing and moving said valve head between any one of said confronting, spaced positions and a second position in engagement with the inner surface of said housing surrounding of the confronting opening for fluid communication therewith.

* * * * *